(12) United States Patent
Rahman

(10) Patent No.: US 10,360,876 B1
(45) Date of Patent: Jul. 23, 2019

(54) DISPLAYING INSTANCES OF VISUAL CONTENT ON A CURVED DISPLAY

(71) Applicant: Amazon Technologies, Inc., Reno, NV (US)

(72) Inventor: Omair Abdul Rahman, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 206 days.

(21) Appl. No.: 15/058,758

(22) Filed: Mar. 2, 2016

(51) Int. Cl.
| | |
|---|---|
| *G06F 3/033* | (2013.01) |
| *G09G 5/14* | (2006.01) |
| *G06F 3/16* | (2006.01) |
| *G09G 5/38* | (2006.01) |
| *G06F 3/01* | (2006.01) |
| *G10L 15/22* | (2006.01) |
| *G03B 37/04* | (2006.01) |
| *G06F 3/0488* | (2013.01) |

(52) U.S. Cl.
CPC .............. *G09G 5/14* (2013.01); *G03B 37/04* (2013.01); *G06F 3/017* (2013.01); *G06F 3/04883* (2013.01); *G06F 3/167* (2013.01); *G09G 5/38* (2013.01); *G10L 15/22* (2013.01); *G09G 2320/10* (2013.01); *G09G 2340/14* (2013.01); *G09G 2354/00* (2013.01); *G09G 2380/02* (2013.01); *G10L 2015/223* (2013.01)

(58) Field of Classification Search
CPC .... G06F 3/017; G06F 3/04883; G06F 3/1454; G09G 5/14; G03B 37/04; B60K 37/00
USPC ................ 345/156, 158, 4; 353/94; 715/769
See application file for complete search history.

(56) References Cited

U.S. PATENT DOCUMENTS

| | | | |
|---|---|---|---|
| 2001/0040671 A1 * | 11/2001 | Metcalf .................. | G03B 37/04 353/94 |
| 2009/0109126 A1 * | 4/2009 | Stevenson .............. | B60K 37/00 345/4 |
| 2009/0278826 A1 | 11/2009 | Murphy | |
| 2012/0060109 A1 * | 3/2012 | Han ....................... | G06F 3/1454 715/769 |
| 2012/0268372 A1 * | 10/2012 | Park ........................ | G06F 3/017 345/158 |
| 2015/0015573 A1 | 1/2015 | Burtzlaff et al. | |
| 2016/0188197 A1 * | 6/2016 | Ryu ..................... | G06F 3/04883 345/156 |
| 2016/0372083 A1 * | 12/2016 | Taite ........................ | G09G 5/14 |

* cited by examiner

*Primary Examiner* — Abdul-Samad A Adediran
(74) *Attorney, Agent, or Firm* — Hogan Lovells US LLP

(57) ABSTRACT

Various approaches discussed herein enable techniques for displaying instances of content on a curved display screen. Multiple users of a curved display screen may desire to view separate instances of content on different regions of the same display screen. A location of the separate users may be determined, and a region associated with each user determined and positioned on the display such that the region is within the field of view of the respective user. The content associated with the particular user is displayed in the region of the display that is directed at the associated user.

20 Claims, 12 Drawing Sheets

400

420

DISPLAYING INSTANCES OF VISUAL CONTENT ON A CURVED DISPLAY

BACKGROUND

As the popularity of digital content continues to rise, people seek to consume movies, television shows, web pages, and other content more and more. As different form factors of computing devices proliferate, this digital content is accessed in different ways, as well as in places traditionally reserved for face-to-face conversation, such as kitchen tables and other common areas. People in such a situation may choose to view content on their own computing device, such as a smart phone or tablet; however, people may also desire to have a single device that can be shared by multiple people in an efficient and communal manner.

BRIEF DESCRIPTION OF THE DRAWINGS

Various embodiments in accordance with the present disclosure will be described with reference to the drawings, in which.

DETAILED DESCRIPTION

Figure 1:
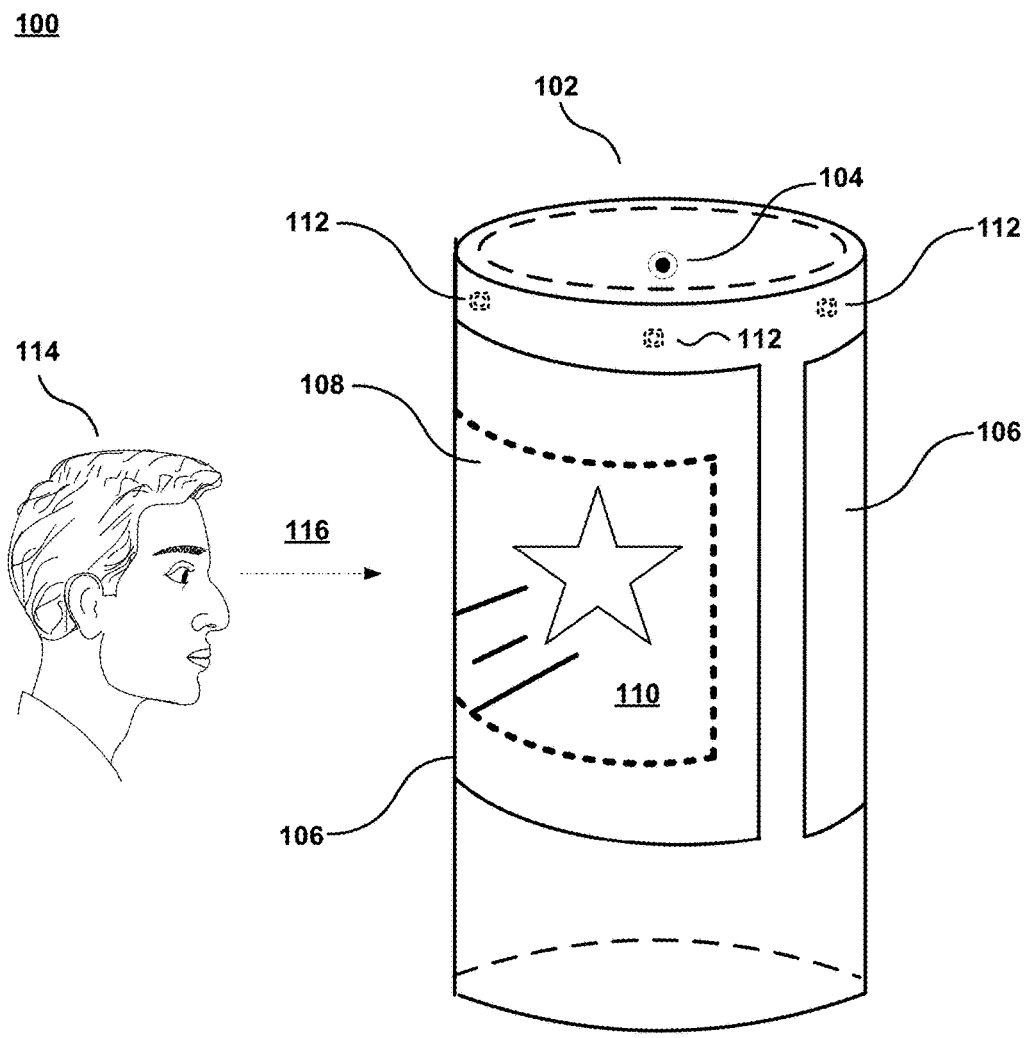
FIG. 1 illustrates a side view of a person viewing content on a computing device with a circular housing and a flexible curved display on the housing, in accordance with various embodiments.

Systems, devices and methods in accordance with various embodiments of the present disclosure may overcome one or more of the aforementioned and other deficiencies experienced in conventional approaches for displaying content (e.g., "visual content") on a curved display. In particular, various embodiments enable a device having a curved display to display one or more instances of visual content on the display, such that multiple users (also, "viewers") may view their own separate instances of content on different areas of the same display, as well as viewing a common instance of visual content wherein the visual content is displayed in a manner that allows the viewers to see substantially all of the common instance of visual content.

For example, some computing devices may have a cylindrical housing, such as a wireless speaker and voice command device that serves as, among other uses, a "digital personal assistant" and media consumption device. Such as device may comprise various components such as a speaker (e.g., to play audio in an omnidirectional fashion), multiple audio capture elements (e.g., microphones) arranged around and/or in the housing for such tasks as voice recognition and voice commands, multiple image capture elements situated around and/or in the housing (e.g., cameras capable of still image capture and video capture) that may perform facial and/or gesture recognition, among other services. Additionally, the device may have additional components such as a flexible display that is attached to (or integrated into, etc.) the housing such that it curves around the cylindrical housing (e.g., paper-based displays, OLED flexible displays, etc.). The curved display may be of varying height (e.g., running less than the full height of the housing) and varying width (e.g., not running the full circumference of the housing).

Previous approaches to displaying instances of visual content (e.g., movies, television shows, digital photographs, web pages, electronic documents, etc.) on devices with curved housings involved using a flat display attached to the housing, which does not offer the ability for users on any side of the curved housing to view the content without impediment. Other approaches using flexible curved displays for content consumption may only display a single instance of the content on the entirety of the curved display, which does not allow all users to see the content; for example, if content is displayed using 300 degrees (of 360 degrees) of a curved display, then users situated on opposite sides of the curved housing would not be able to view the entire content due to some portions of the single instance of content being on the display in front of one user while other portions of the single instance of content is being displayed in front of the other user.

Accordingly, approaches in accordance with various embodiments improve the operation and performance of computing devices, such as those on which they are implemented by offering, among other advantages, an automatic approach to displaying single and/or multiple instances of visual content on a curved display, as may be attached to a curved housing of a computing device, such that multiple viewers may view the entirety of a single instance of visual content shared by multiple viewers, or separate instances of visual content may be viewed in their entirety by multiple viewers situated at various points around the circumference of the housing.

Various approaches discussed herein enable a computing device having a curved housing and a curved display (e.g., a flexible display) situated on, wrapped around, or integrated into the housing to display single and/or multiple instances of visual content. Example computing devices contemplated by the approaches described herein may allow a viewer to invoke a command by, for example, speaking a trigger word or phrase, which may be the name of the device or another word, and which alerts the device to listen for a command or other audio input. For purposes of this disclosure, the trigger word will be referred to generically as "[DEVICE]," although it should be understood that any number of variations on the trigger word or phrase are contemplated.

According to various embodiments, audio associated with a viewer may be captured; for example, by one or more audio capture elements/devices (e.g., microphones) that may be located inside the device housing, or disposed around the circumference of the device, such as one audio capture element disposed every 10 degrees around the housing, etc. According to an embodiment, the captured audio may comprise the viewer speaking the trigger word followed by a voice command (e.g., "[DEVICE], play 'Casablanca,' "[DEVICE, show me my e-mail," etc.), or may comprise voice recognition of ambient conversation including the viewer, etc. Once audio from a particular viewer is captured, then a direction of the viewer with respect to the housing may be determined (e.g., a direction vector in the direction of the determined location/position of the viewer). For example, by using a single or multiple audio capture elements, a direction the audio originated from may be determined, for example by determining how loud the captured audio is at each of several audio capture devices, which may then be used to triangulate or otherwise determine a direction (e.g., beamforming, etc.) of the source (origin location) of the audio using a location, position, and/or direction of the audio capture device(s) in the housing, among other techniques. In various embodiments, image capture elements/devices may be used, such as video cameras, and facial recognition or other techniques performed to identify a specific viewer and/or their position/direction with regard to the device, as discussed herein.

Audio associated with another viewer may similarly be captured, and a direction associated with the other viewer determined; for example, a direction vector in the direction of a location/position of the other viewer may be determined upon capturing audio associated with the other viewer. As an example, the viewer may each have a distinct code word that the viewer uses when addressing the device, which allows the device to determine the viewer that the captured audio is associated with. For example, "[DEVICE], this is Tom. Play 'Casablanca'." In other embodiments, voice recognition may be used, or similar techniques.

According to an embodiment, once direction vectors or other direction/position/location identification of each viewer is performed, then content associated with each viewer may be determined, although the order of operations is not mandatory. For example, viewer A may be identified and a direction towards viewer A determined, then a particular instance of visual content is then determined. A similar step is performed for each potential viewer. Each instance of visual content has various properties associated with it; for example, size, resolution, sampling rate, aspect ratio, etc. In an embodiment, a size of each instance of visual content is determined. A region of the display is then determined for each instance of visual content desired to be displayed, and using at least the direction vectors determined for each viewer, the region for the instance of visual content associated with each viewer is determined and has a location on the display that is facing the corresponding viewer; for example, viewer A asks for "Casablanca" to be displayed, and a region of the display having a size in which "Casablanca" can be displayed is determined, the region being substantially centered in the field of view of viewer A. That is, the region is substantially centered according to the direction vector determined for the corresponding viewer, such as by having a horizontal midpoint of the region substantially aligned with the direction vector pointing to the location/position of viewer A. In an embodiment, this procedure may be performed for each viewer (e.g., viewer A and viewer B) that desires to view instances of visual content on the display, and once the regions are determined, aligned, and do not overlap, then separate instance of visual content may be displayed for each individual viewer such that each viewer is able to view the entirety of "their" visual content.

According to various embodiments, multiple viewers are viewing their respective instances of visual content, and movement by one or both of the viewers is detected using various techniques described herein. For example, a viewer watching her instance of visual content on a region of the display that is substantially centered/directed to her may start moving (e.g. laterally, sideways, horizontally, etc.) with relation to the device, such as around a circular kitchen table. The movement is detected, and a new location/position of the viewer(s) who moved is determined. Once a direction corresponding to the new position of the moved viewer is determined, then a new region of the display screen facing in the direction of the viewer's new position (e.g., the direction vector associated with the viewer's new position is in the center of the new region of the display) that is sufficient to display the respective instance of video content is determined. For example, if a viewer moves such that their new position is 30 degrees towards the other viewer's position (when considered in relation to the 360-degree circumference of a substantially circular device, for example), then a size of the new region is determined such that the instance of visual content can fit within it. For example, dimensions equal or greater than those of the instance of visual content are determined and assigned to the new region of the display, then the new region is centered and/or otherwise positioned such that is faces the new viewer's position. Then it is determined whether the new region, as properly sized and positioned, overlaps or otherwise intersects with the region of the display in which the instance of visual content associated with the other viewer is being rendered.

According to various embodiments, if the regions overlap, then the regions "snap" together; i.e., the two regions are combined such that only one of the instances of visual content is being rendered in it. A decision regarding which of the respective instances of visual content is to be displayed may be determined in various ways; for example, by a ranking technique that uses various criteria to rank the instances of content such that the higher-ranked instance takes precedence. In other embodiments, the first instance to be played may take precedence, or the last instance. The combined region may be resized or otherwise modified so that the higher-ranked or otherwise selected instance of content may be displayed in full resolution, or may be modified to fit within a particular size region of the display. The region of the display (and by extension, the instance of content) is then centered such that both viewers may see the entire instance of content; for example, a midpoint between direction vectors pointing at the respective viewers may be determined, and used to center or otherwise position the combined region of the display.

According to various embodiments, if two or more viewers are viewing a single instance of visual content on a combined region of the display as described above, and one of the viewers moves such that a region in which their originally-playing content may be rendered may be determined such that it does not overlap with a region that can play the instance of content associated with the non-moving viewer and that is centered according to the non-moving viewer's position (i.e., the direction their position is relative to the device) as described herein, then the combined region may "un-snap" such that two regions are utilized to render the separate instances of content, as described herein.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

FIG. 1 illustrates a side view 100 of a person viewing content on a computing device with a circular housing and a flexible curved display on the housing, in accordance with various embodiments. As illustrated in FIG. 1, an example substantially cylindrical computing device 102 enclosed by a substantially circular housing is displayed, on which is disposed a power/sleep button 104, various audio capture elements, image capture elements, and/or gesture capture elements 112, and a circular display 106 wrapped around the housing. In various embodiments, the above-referenced elements, along with other or additional elements, devices, or components, may be disposed on the housing, enclosed within it, and/or otherwise integrated into the housing in various measures. According to an embodiment, display 106 comprises a single piece of flexible display laminated to the housing.

In the example embodiment of FIG. 1, a viewer 114 is watching an instance of visual content 110 on the display 106. As discussed earlier, a drawback of other approaches was that instances of visual content would be displayed on the entire display. The example embodiment of FIG. 1, and the techniques described herein, address this and other shortcomings of other approaches by rendering the instance of visual content 110 in a region 108 of the display that is positioned (e.g., centered) in the field of view 116 of the viewer 114 and sized (e.g., by determining a horizontal dimension viewable by the viewer in its entirety and sizing the vertical dimension accordingly so as to fit the instance of visual content, or utilizing various techniques such as those discussed with regard to FIG. 5, etc.) such that in various embodiments, the viewer 114 may see the entirety of the instance of content 110 as being rendered in the region 108 of the display 106. According to various embodiments, a user may select to view a particular instance of content (or all instances of a particular type of category of content, etc.) such that the content is displayed over the entire display 106 or in a region that is larger than the particular user's field of view can fully see; for example, a fireplace screen saver, etc. However, if the instance of content 110 is of a particular type, or selected by the user, then the content 110 may be rendered in the region 108 according to its native resolution, size, aspect ratio, etc., or a modified resolution, size, aspect ratio, etc., that is determined by various techniques and/or calculations (such as those described with regard to FIG. 5, etc.) that specify a maximum size of content (e.g., in x and y dimensions) that may be fully viewed by a particular user.

Figure 2A:
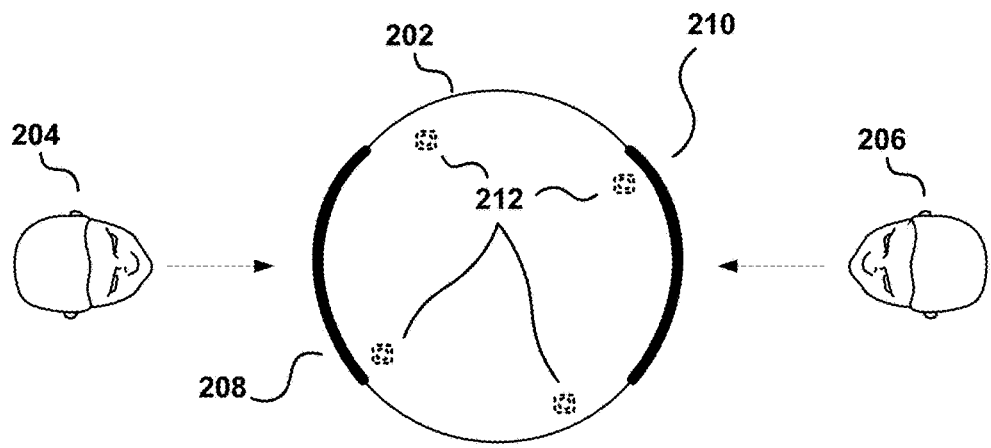
FIG. 2A illustrates a top view of two people viewing separate instances of visual content on a curved display, in accordance with various embodiments.

FIG. 2A illustrates a top view 200 of two people 204, 206 viewing separate instances of visual content on regions 208, 210 of a curved display 202, in accordance with various embodiments. In the example illustrated in FIG. 2A, the display 202 is a single piece of flexible display laminated to a housing of the device (shown only in top down view), although the techniques described in the present specification are not limited to one particular type of display technology. While one person may view an instance of content on a curved display, as in the example illustrated in FIG. 1, there may be situations in which a device such as illustrated in the figures is placed in a common area; for example, on a kitchen table where multiple people may sit, each being positioned differently with regard to the device (e.g., in different directions from the device). Instead of having a single person monopolize the device to view an instance of visual content, according to various embodiments, multiple instances of visual content may be displayed in separate regions 208, 210 of the circular display 202 so more than one person can view content on the device at the same time as another person. According to various embodiments, the multiple regions 208, 210 are maintained as separate and do not overlap; however, in various embodiments, some degree of overlap may be allowed; for example, an overlap threshold may be set, and an amount and/or percentage of overlap between two or more regions 208, 210 on a display may be allowed, for example.

According to an embodiment, the instances of content rendered for each viewer 204, 206 in the respective regions 208, 210 facing the viewer are independent and selected by the particular viewer. For example, one viewer 204 may desire to view a website showing a stock portfolio, and the other viewer 206 may desire to view a TV show. In order to render the instances of content in a particular size and in a location of the display such that each viewer 204, 206 can view the entirety of their respective content, a position of the viewer 204, 206 may be determined. For example, using one or a combination of techniques, such as audio capture, image capture, voice recognition, facial recognition, etc. For example, the device may include various audio capture elements, image capture elements, and/or gesture capture elements 212, disposed at various positions in, on, or around the device. In the example of FIG. 2A, the audio capture elements 212 capture audio from each viewer 204, 206; for example, when one viewer 204 may speak a trigger and/or command to the device, such as "[DEVICE], this is Tom. Show me my stocks," and the other viewer 206 may speak a trigger and/or command to the device, such as "[DEVICE], this is Jerry. Play 'SportsCenter'."

According to an embodiment, the position of the regions 208, 210 of the display within which the desired instances of visual content are then rendered are determined at least in part on a direction of each respective viewer to the device, as may be determined in various embodiments by, for example, determining which audio capture elements 212 received the audio commands, determining the respective volume of the audio commands at each audio capture element 212, and based on the volume and the location of the particular audio capture element 212, determining a direction vector that points in the direction of a position of the viewer 204, 206. By determining direction vectors, each pointing towards a location of the viewers 204, 206, then a region 208, 210 for each viewer 204, 206 may be located on the display that is substantially centered to the respective viewer 204, 206 (e.g., on the horizontal axis of the region).

According to an embodiment, as long as the two regions 208, 210 have enough angular distance away from each other, then both regions 208, 210 may be utilized to render the desired content for each viewer 204, 206 without the regions or content overlapping. In various embodiments, as described herein, a viewer may move around the device, such that a region that is similarly centered for the field of view of the viewer would overlap with another region associated with another viewer. While in some embodiments, some degree or amount of overlap of the regions 208, 210 would be acceptable, in other embodiments, a detection of a potential overlap will result in a single combined region of the display being determined and a single instance of content being rendered within that is in the field of view of both viewers.

Figure 2B:
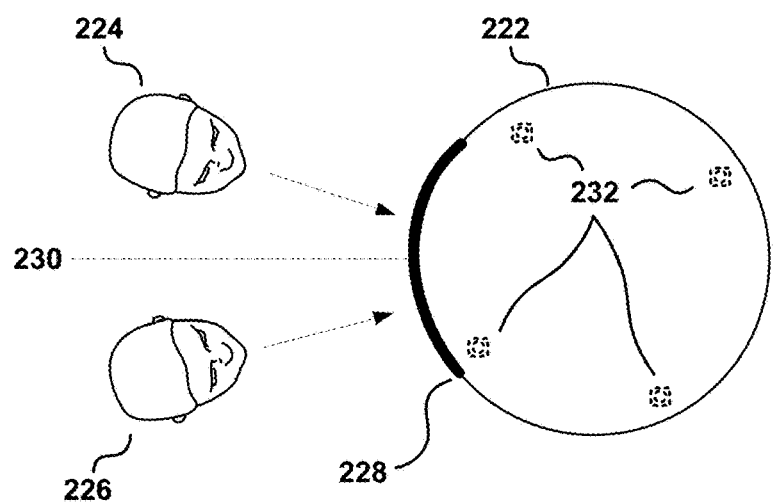
FIG. 2B illustrates a top view of two people viewing an instance of visual content on a curved display, in accordance with various embodiments.

FIG. 2B illustrates a top view 220 of two people viewing an instance of visual content on a curved display, in accordance with various embodiments. In the example illustrated in FIG. 2B, two viewers 224, 226 are viewing a single instance of visual content that is being rendered in a region 228 of a curved display 222. According to an embodiment, the region is positioned on the display such that the center of the region (i.e., the rendering window) is at the centroid of the 3-dimensional space that the two viewers 224, 226 are on. Once the two viewers 224, 226 are located (e.g., using various audio capture elements, image capture elements, and/or gesture capture elements 232 and the audio recognition and direction determination techniques described earlier, etc.) and, in some embodiments, a direction vector emanating to each position of the respective viewers 224, 226 is determined, then a midline 230 between the viewers 224, 226 may be determined and the region 228 positioned on the display element such that a horizontal midpoint of the region 228 is substantially aligned with the midline 230 (i.e., the region is substantially centered between the viewers 224, 226). This allows both viewers 224, 226 to view content rendered in the region 228 without having to change their relative positions to each other. A midline 230 between users (e.g., a point along the horizontal axis of the device circumference substantially in the middle of the determined directions of the viewers, or a direction vector or axis emanating from the device and being normal to the device housing, the direction of which points substantially midway between the direction vectors directed to the users, such that the angle between the direction vectors pointing in the determined direction of the users and the midline is substantially equal) may be determined in various ways, such as by determining an arc length of the distance along the circumference of the housing between the points at which the direction vectors pointing at the users intersect the housing; for example, assuming the device has a radius $R_d$, and a central angle C between the direction vectors emanating from the center of the device to each position of the respective viewers 224, 226, then the arc length between points on the circumference (e.g. housing) of the circular device corresponding to where the direction vectors intersect the housing may be solved; for example, $$\text{arc length} = 2\pi Rd\left(\frac{c}{360}\right) \quad (1)$$

Figure 5:
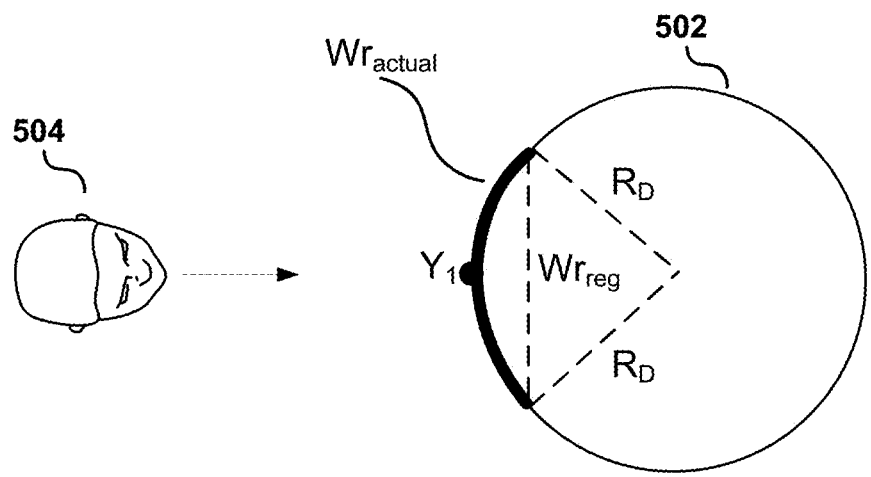
FIG. 5 illustrates an example diagram of displaying visual content on a curved display, in accordance with various embodiments.

Dividing the arc length in half, where there are two viewers, for example, will provide an approximate distance on the circular housing midway between the two viewers (e.g., halfway between the two locations on the housing intersected by the direction vectors). A point at this location, or an axis or vector emanating from the device and being normal to the housing at this location between the two viewers may be considered a midline 230. A location point centered vertically and horizontally along the display (such as between the points along the housing where the direction vectors towards the viewers emanate) facing the viewers at which the midline 230 emanates from the housing may also be considered a midline 230, such as location point $Y_1$ of the region of the display as illustrated in FIG. 5.

Figure 3A:
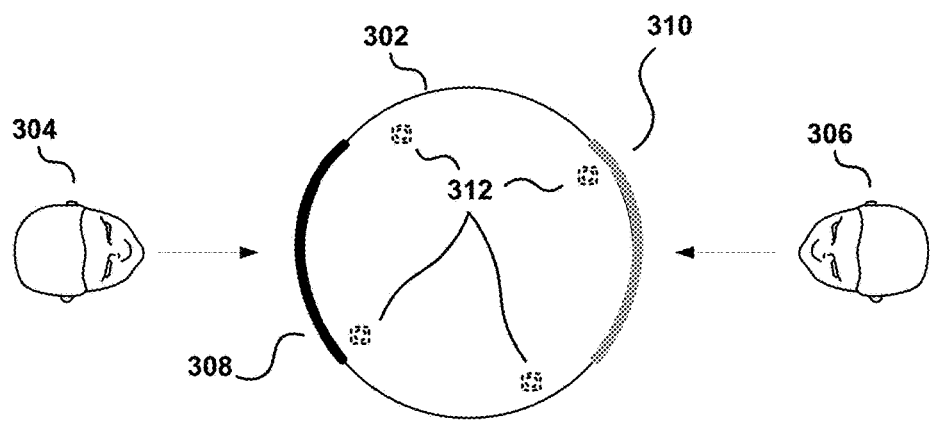
FIGS. 3A-3C illustrate top views of example approaches for merging multiple instances of visual content on a curved display, in accordance with various embodiments.
Figure 3B:
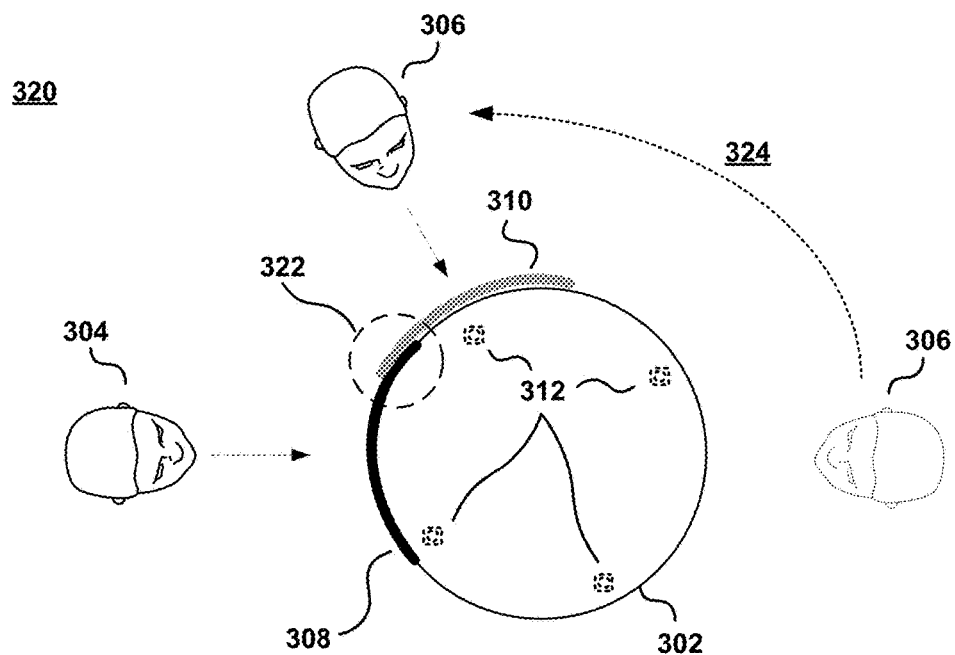
Figure 3C:
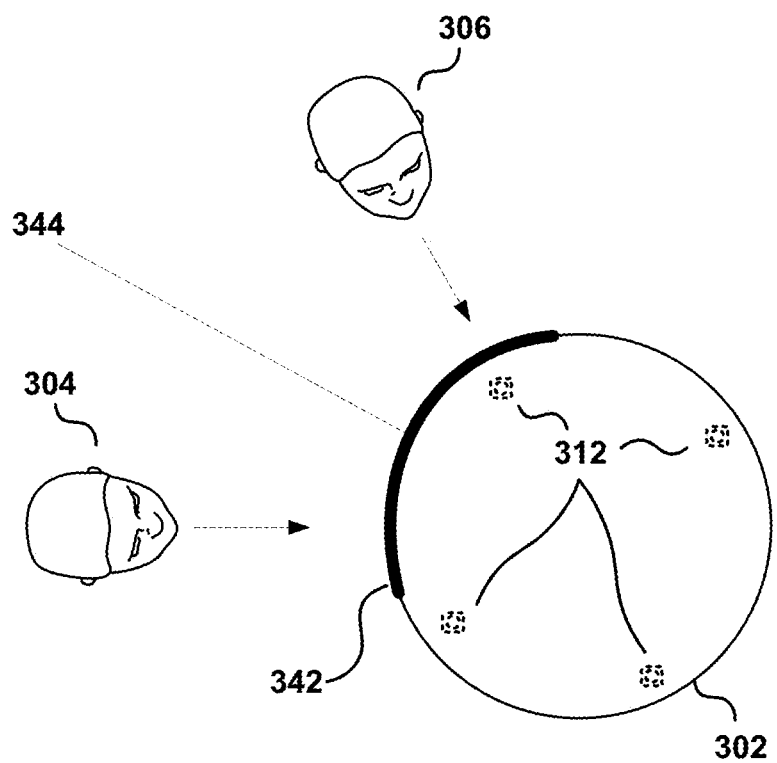

FIGS. 3A-3C illustrate top views 300, 320, 340 of example approaches for merging multiple instances of visual content on a curved display, in accordance with various embodiments. It should be understood that reference numbers may be carried over between figures for similar components for purposes of explanation, but that such use should not be interpreted as a limitation on the various embodiments.

In the example 300 of FIG. 3A, two viewers 304, 306 are viewing separate instances of visual content (not shown) that are being rendered on separate regions 308, 310 of the display 302. As discussed earlier, various audio capture elements, image capture elements, and/or gesture capture elements 312 of the device are used in various embodiments to determine a direction facing the viewers 304, 306, which direction, along with other techniques (such as those discussed with regard to FIG. 5, etc.), are used to determine a size and position of each respective region 308, 310 on the display such that the instances of visual content rendered on the regions 308, 310 may be rendered fully within the field of view of each viewer 304, 306. For example, each region is centered facing a viewer, based on a direction vector emanating from the device to the respective viewer that is determined according to various techniques, such as audio location, face tracking, motion tracking, etc.

In the example 320 of FIG. 3B, one viewer 306 has moved from his original position along a path 324 around the circumference of the device; e.g., laterally with respect to the device instead of moving straight toward or straight away from the device. While the motion of the viewer 306 in FIG. 3B is illustrated as maintaining a substantially constant distance between the viewer 306 and the device, in various embodiments, this is not required; rather, a technique such as determining a direction vector that points in a direction of a viewer's (new) position with respect to the device is utilized. According to an embodiment, when referring to a distance of a movement of a viewer, it should be understood that a movement of the viewer is an act of the viewer changing physical location with respect to the device. A distance between the original location and the new location may be considered as the "distance of the movement."

According to an embodiment, the viewer's 306 new position after moving along the path 324 is determined (e.g., the direction of the viewer in relation to the device), for example by utilizing various audio capture elements, image capture elements, and/or gesture capture elements 312 as discussed herein. Once the viewer's 306 new position is determined, then a potential region 310 is determined within which the viewer's 306 instance of visual content is to be rendered. As discussed herein, the potential region 310 is positioned based upon various factors, such as the viewer's 306 new position, aspects of the instance of visual content, etc., and is positioned within the viewer's 306 new field of view at the new position; e.g., substantially centered based on the viewer's 306 new position.

According to an embodiment, a determination is made that an overlap 322 exists between the potential region and the other viewer's 304 region 308 of the display on which her instance of visual content is being rendered. In an embodiment, determining that the existing region 308 for the non-moving viewer 304 (although in various embodiments, both viewers may have moved and a potential region is determined based upon both movements, etc.) and the potential region 310 for the moving viewer 306 have an overlap 322 will result in a single region being "snapped" together, as described with regard to FIG. 3C. In other embodiments, a determination regarding an amount of the overlap 322 is made, and is compared to a threshold amount of allowable overlap. If the amount of overlap 322 is within a threshold amount of acceptable overlap, then the instance of visual content for the moving user 306 may be rendered on the potential region, potentially resulting in the instance of visual content overlapping the instance of visual content being rendered in the other viewer's region 308 of the display.

According to an embodiment, a determination may be made that one or more of the instances of content may be modified (e.g., made smaller in area), such that the respective region of the display within which the content is being rendered may be reduced in size (e.g., horizontal dimensions and/or vertical dimensions). For example, once a potential overlap 322 is determined, then a determination is made that the instance of visual content associated with the moving viewer 306 may be modified; for example, changed to a 4:3 aspect ratio from a 16:10 ratio, thereby reducing the horizontal dimensions of the content. As a result, the potential region 310 that is overlapping 322 with the other viewer's 304 region 308 may be reduced in size to contain the newly-modified content, and as a result, the overlap may be eliminated or reduced below a threshold amount. While a change in aspect ratio is one example of modification to content that may be made in various embodiments, it should be understood that various types of modifications made be made to the rendered content; for example, resizing, resampling, changing aspect ratios, etc. The modification may be made to one instance of content or both, and the type of modification or each instance of content may be selected based upon an order of preference that may depend on a viewer's identity, a type of the content, a category of the content, a setting associated with the content, etc. For example, content corresponding to a "website" category or type may have a higher preference to be modified than content corresponding to a "movie" category. Likewise, content corresponding to a particular type, category, or preference ranking may be selected for modification ahead of another instance of content. For example, in the example of FIGS. 3A-3C, instead of the moving viewer's 306 content being modified as described above, the non-moving viewer's 304 content may be modified to minimize or eliminate an overlap 322, as described above, instead of the moving viewer's 306 content, based on various factors, settings, preferences, etc.

According to an embodiment, as the moving viewer 306 is moving along the path 324, the movement is being monitored (e.g., tracked), for example by a camera. For example, there may be several image capture elements 312 (e.g., video cameras) disposed around the circumference of the device housing, that may identify users based on such factors as facial recognition or other technique(s). As the moving viewer 306 moves along the path 324, the direction of the moving viewer's 306 constantly updating position along the path 324 is tracked and a location, size, etc. of the potential region 310 is updated at a particular frequency (e.g., in real-time, every 2 seconds, every 10 frames of content, etc.). As a location on the display 302 of the potential region is determined (i.e., as the moving viewer 306 is moving), if a potential overlap is determined to occur, or it is determined that an overlap will occur within a certain threshold of time (within 2 seconds, within 10 frames of content, etc.) under current or estimated parameters (e.g., the moving viewer continues moving in a particular direction, at a particular rate, etc.), then feedback may be provided that alerts the viewers 304, 306 to the potential overlap condition, and in some embodiments prior to "snapping" the regions together, as described with regard to FIG. 3C. For example, audio feedback may be provided, or visual feedback may be displayed on the display 302 (e.g., a light, text, etc.).

An example of visual feedback is causing a visual indicator associated with the first viewer 304 to be displayed, along with causing a visual indicator associated with the moving viewer 306 to be displayed. These visual indicators may substantially correspond to potential positions and/or directions of the first viewer 304 and moving viewer 306 with respect to the housing; for example, the indicators may indicate a position with respect to the housing, and if either viewer moves with regard to the housing and passes the indicator, then an overlap will occur. As long as the viewers 304, 306 do not move beyond the position of their respective visual indicators (e.g., too close too each other, as measured by the visual indicators). In effect, the visual indicators indicate the closest that the viewers 304, 306 can be to each other without an overlap condition occurring (without one or both of the instances of visual content being modified, as described earlier).

In the example 340 of FIG. 3C, in response to determining that an overlap condition occurred, as described with respect to FIG. 3B, a new region 342 of the display 302 is determined, within which one of the two instances of content is rendered. Once a position of a location associated with the two viewers 304, 306 is determined, then a direction vector towards the viewers' positions may be determined and a midpoint vector 344 emanating from the display and being substantially equally between the direction vectors corresponding the the viewers' positions. For example, the regions associated with the viewers may combine together and be positioned in the field of view of both viewers, such that both viewers may view the entire instance of content rendered in the region. In an embodiment, a visual transition may accompany the combining of the regions; for example, a visual "snapping" or "sliding" of the instances of visual content may occur to indicate the combining of the regions.

As discussed earlier with regard to FIG. 3B, various priority rankings and/or data may be utilized to determine which instance of content is selected as the instance to be rendered in the new region. For example, the last viewer to issue a command may receive precedence on the content to be rendered, or vice versa.

According to an embodiment, after a combining of the regions as described with regard to FIG. 3C, if the viewers move far enough away from each other so that each viewer may again have a separate region within which their visual content may be rendered, an example described with regard to FIG. 3A, then the combined region may be separated into two separate regions, each being associated with a separate viewer and being positioned as described herein. A visual indicator may accompany such a separation event; for example, a visual "unsnapping" or "sliding apart" of the instances of visual content may occur to indicate the separation of the regions.

Figure 4A:
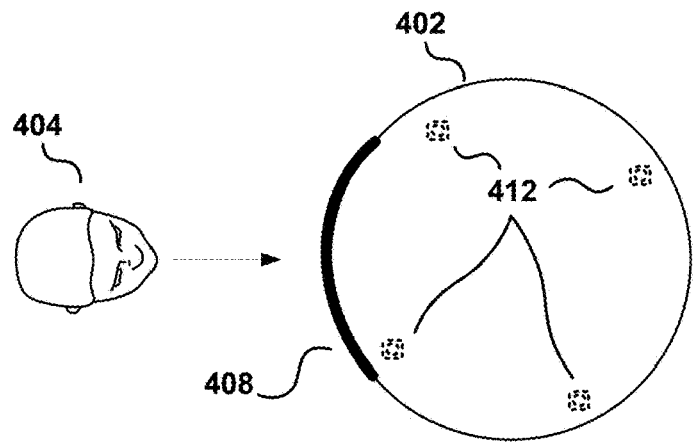
FIGS. 4A-4C illustrate top views of an example approach for moving visual content on a curved display, in accordance with various embodiments.
Figure 4B:
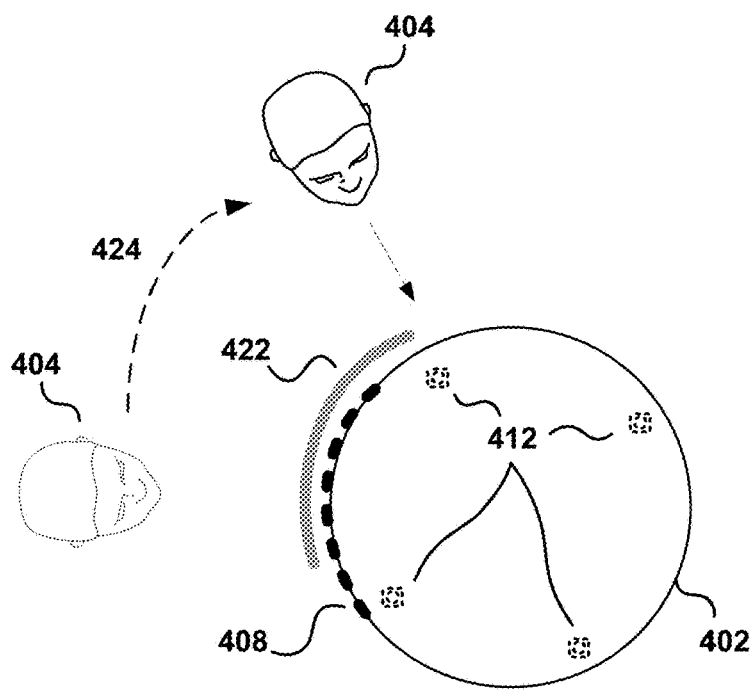
Figure 4C:
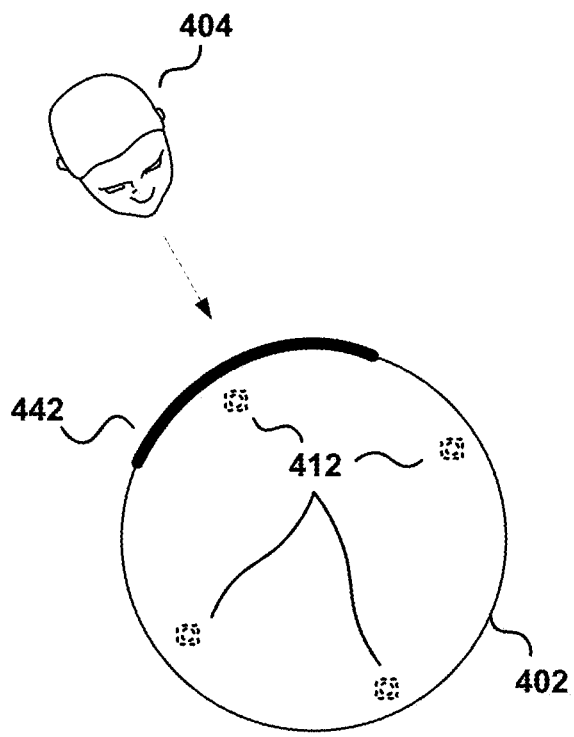

FIGS. 4A-4C illustrate top views 400, 420, 440 of an example approach for moving visual content on a curved display, in accordance with various embodiments. In the example 400 of FIG. 4A, a viewer 404 is watching an instance of visual content being rendered on a region 408 of a curved display 402. As described earlier, the region is substantially centered in the viewer's 404 field of view using techniques described herein; for example, using beamforming to determine a direction of the viewer's 404 location with regard to the device, using various audio capture elements, image capture elements, and/or gesture capture elements 412.

In the example embodiment 420 of FIG. 4B, the viewer 404 has moved along a path 424 to a new location with respect to the device. As the viewer 404 moves along the path, the movement may be continuously tracked, for example using image capture elements 412 to perform facial recognition of the viewer 404, or other types of identification and monitoring. As the viewer 404 moves along the path, a new updated region 422 is continuously or periodically updated based on the viewer's 404 movement 424. Because the viewer 404 has moved from his original location, the original position of the region 408 in which his content was originally rendered is no longer substantially centered on the viewer's 404 field of view (e.g., a direction vector pointing at the viewer from the display is no longer substantially centered in the horizontal aspect of the original region 408).

According to an embodiment, a smoothing or averaging technique may be utilized with respect to correlating the movement of the viewer 404 with movement of the region in which the content associated with the viewer is rendered. For example, if the region of the display associated with the viewer were to immediately shift in response to a detected movement of the viewer 404, then even a small movement of the viewer 404 in a side-to-side, back-and-forth fashion may cause the content rendered in the region to shift in a corresponding fashion along with the determined movement. This could result in distraction to the viewer; further, it may not be necessary to maintain the rendered content fully in the viewer's 404 field of view, because the movements of the viewer 404 were minimal.

According to an embodiment, a movement of a viewer 404 (e.g., in a lateral direction around the housing, as in FIG. 4B) is determined. If the distance of the movement exceeds a particular threshold distance (e.g., 3 feet), then that may initiate a determination on where to move the region associated with the viewer 404. This may include determining a rate of the movement, and updating the position of the region 422 on the display 402 associated with the viewer 404 for a currently-displayed frame of the visual content (or other measurement associated with display of the visual content, such as time). This updated position may be based on the direction of the movement 424, the rate of the movement 424, and/or other characteristics of the movement. As the viewer 404 is moving 424, the current frame of the visual content (or using the other measurement associated with the visual content as a timing mechanism) is caused to be rendered in the region 422 having the updated position on the display 402.

According to an embodiment, there may be a slight lag when the viewer 404 starts moving 424, as a smoothing or averaging approach to determining the viewer's 404 movement 424 is utilized to prevent the position of the region 422 from being adjusted in a jerking, varying-speed manner. For example, content is rendered in the region by a video processor. The video processor is given an origin point from which to render the visual content. As each frame is rendered, a decision is made regarding where the origin point of the next frame will be positioned. If a viewer 404 moves at a constant rate in a specific direction (e.g., around the device), then an origin point for the rendering of the content, and similarly for the region in which the rendering will be displayed, is moving along with the viewer; however, techniques such as a rolling average, extrapolation, or smoothing may be utilized along with motion determination (e.g., vector direction estimation) in order to change the region 422's position in a smooth manner so that the content rendered in the region does not appear to move in a haphazard fashion as it "follows" the viewer around the device.

According to an embodiment, a new value corresponding to a viewer's position may be determined each sensory cycle (e.g., each time image capture elements 412 perform facial recognition of the viewer 404, etc.). If the viewer was considered to be previously static (i.e., not moving), and a new value of the viewer's position exceeds a particular threshold distance (e.g., as described above), the device may enter a "new motion mode" in which prediction of the viewer's next position may be determined according to various interpolation algorithms known in the art. In various embodiments, an origin location of the next frame of visual content will remain the same as before, until the device enters the "sustained motion mode," as described below.

For example, if for a particular number of next n sensory cycles, the viewer is determined to continue being in motion (e.g., each sensory cycle, the new position of the viewer is at least a threshold distance or level away from the previously-determined value), then the device may enter a "sustained motion mode" in which the prediction of the viewer's next position is determined and an origin location of the next display frame is determined according to the predicted position of the viewer.

The sensor time period ($t_s$) may in various embodiments be slower than the rendering frame rate ($f_{frame\ rate} > (1/t_s)$), but higher than an expected velocity of the viewer's motion. This allows for reduction of "jitter" caused by updating an origin point of the visual content too frequently, as the sensor cycle only updates the origin point every few frames. If the sensory cycle in various embodiments is high, then an update may only be performed every L frames of visual content, where L corresponds to a comfortable length of frames that should remain unmoved, as may be determined by subjective preferences of a viewer, for example.

Various interpolation approaches, such as cubic spline interpolation, may be utilized to determine a predicted next position of a viewer, such as while the viewer is in a "sustained motion mode. The motion of the viewer may be considered non-uniform, as the sensors may capture motion data over a wide field of view. The viewer may start moving, then accelerating, then decelerating, for example if there are objects in the viewer's path around the device.

In the example embodiment 440 of FIG. 4C, the viewer 404 has stopped moving, and the region 442 associated with the new position of the viewer 404 has similarly stopped moving.

FIG. 5 illustrates an example diagram of displaying visual content on a curved display 502, in accordance with various embodiments. In the example of FIG. 5, factors relating to a calculation of an actual width ($Wr_{actual}$) of visual content are illustrated. According to an embodiment, viewable area on a curved display is dependent on several factors, such as the resolution of the display, the height of the display, the radius of the curvature, etc. Content to be displayed on the curved display may need to be resized to fit in the viewable area, and if multiple viewers each desire to view separate instances of content on the same curved display, then various calculations need to be made in order to prevent the two renderings of content from overlapping on the display.

According to an embodiment, one approach to determining an actual width is as follows. Assuming a device with radius $R_d$ and a known value $Wr_{reg}$, which is a value (e.g., in mm) of width above which visual content should not be rendered (also referred to herein as a "maximum width threshold value"), because above that value, due to the curved nature of the display 502, the visual content may go out of viewing range or become too distorted to view. If the display has a height of $H_d$ mm and a width of $W_d$ mm, the actual rendered length $Wr_{actual}$ may be calculated as:

$$S = r\theta \qquad (2)$$

$$W_{r\_actual} = R_d \theta \qquad (3)$$

where $\theta$ is the angle between the two lines in FIG. 5 marked $R_d$. Using the Law of Cosines to find the included angle:

$$\cos(\theta) = \frac{R_d^2 + R_d^2 - W_{r_{reg}}^2}{2(R_d^2)} \qquad (4)$$

$$\theta = \cos^{-1} \frac{2R_d^2 - W_{r_{reg}}^2}{2(R_d^2)} \qquad (5)$$

Then Equation (3) becomes:

$$W_{r\_actual} = \frac{2R_d^2 - W_{r_{reg}}^2}{2(R_d)} \qquad (6)$$

Given the equations above, the height and width of the rendered frame may be determined, according to an embodiment. The visual content may be resized (e.g., using scaling) and centered at the location point $Y_1$ of the region of the display 502 facing the viewer 504.

As discussed herein, various techniques may be utilized to determine the location of a viewer (e.g., the direction of the viewer's location with respect to the device). For example, beamforming techniques may be used with audio capture elements to determine the source of an audio command. Imaging systems (e.g., cameras, facial recognition, etc.) may also be utilized to increase the accuracy and resolution of the system's ability to determine the direction of the viewer.

According to an embodiment, the resolution of the system may be considered to be a number of individual directions the device can determine around the radius of the cylindrical device. For example, if a device has eight audio capture elements disposed around the radius of the cylindrical device, then the system can determine eight individual directions. Assuming the resolution in angles is $\theta_{res}$:

$$\theta_{res} = 360 \deg / R_s \qquad (7)$$

In an embodiment, the visual content will be centered on the direction (vector) of the user as determined by the device; therefore, the content can be placed in intervals of xxx apart, in terms of center location.

$$S = r\theta \qquad (8)$$

$$Y_{res} = R_d \theta_{res} \qquad (9)$$

The above equations provide a determination of how wide content may be and how close the content may be placed together (side-by-side). The closest any two instance of visual content can be rendered side-by-side would be $\theta_{min}$.

$$\theta_{min} = Y_{res} \text{ if } Y_{res} > W_{r\_actual} \qquad (10)$$

$$\theta_{min} = W_{r\_actual} \text{ if } Y_{res} \leq W_{r\_actual} \qquad (11)$$

As long as the direction determined for the two viewers (e.g., by the audio capture beamforming, the video capture, etc.) is greater than $\theta_{min}$, two instances of visual content may be rendered at two separate locations without overlapping.

Figure 6:
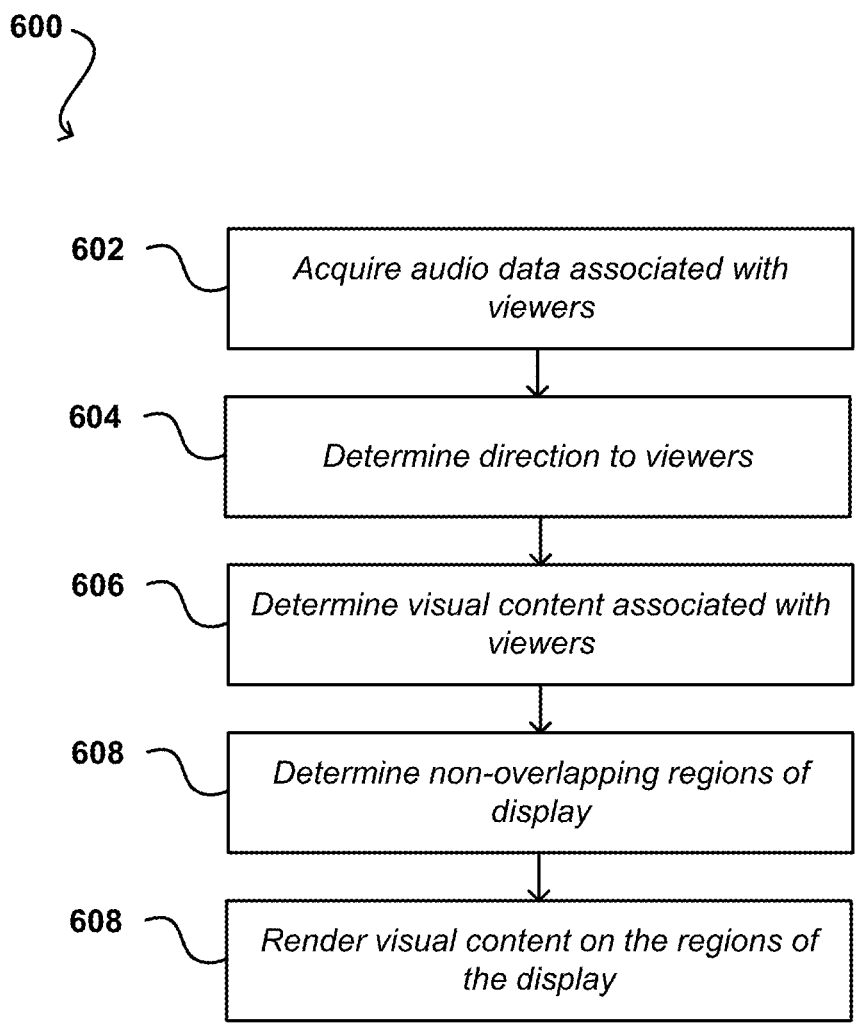
FIG. 6 illustrates an example process for displaying instances of visual content on a curved display, in accordance with various embodiments.

FIG. 6 illustrates an example process for displaying instances of visual content on a curved display, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In accordance with various embodiments, audio data is acquired 602 that is associated with one or more viewers of a curved display. For example, as described earlier, there may be one or more audio capture elements (e.g., microphones, etc.) arrayed around the circumference of the housing, although in various embodiments one or more audio capture elements may be combined with other data capture elements, and may be positioned in various places within, on, or external to the device. The audio data may take the form of an audio command, which in various embodiments serves to identify a particular viewer to the device (e.g., through voice recognition, the use of a keyword associated with a particular viewer, etc.), as well as identify an instance of visual content the viewer desires to see (e.g., "Alexa, show me my stocks.").

Once audio data for the viewer(s) is acquired, a direction to each of the viewer's locations with respect to the device is determined 604. For example, using beamforming techniques on the captured audio, a direction to the determined location (e.g., position relative to the device) of the viewer may be determined; for example, a vector emanating towards the determined location. While in some embodiments a distance of a viewer to the display may not be determined (although in other embodiments a distance is determined and utilized, for example to determine a desired size of content to be rendered on the display), a direction towards where the viewer's audio emanated from may be determined and used to determine a region of the display, as described herein. In various embodiments, other data capture elements may be used instead of, or along with, audio capture. For example, image capture elements (e.g., video cameras) may be used to determine a location and direction of the viewers.

Once a direction to the viewer(s) is determined, then instances of visual content associated with the viewers are determined. For example, in the example where a user uses a voice command, "Alexa, show me my stocks," the instance of visual content may be a web page of the particular user's stock holdings at a brokerage, or a watch list of stocks at a search engine, etc. Other types of content are described herein; for example, digital content such as movies, TV shows, digital images, etc. According to an embodiments, various properties and/or characteristics pertaining to the instances of visual content are determined; for example, size (e.g., pixel dimensions), aspect ratio, sampling rate, etc.

Regions of the display are then determined 608, such that the individual regions do not overlap with each other, although as described herein, in some embodiments some measure of overlap may be acceptable. As described herein, a region for each instance of visual content desired to be displayed for the particular viewers is determined, such that the regions are of an acceptable size to display the instances of visual content. The regions may be substantially centered with respect to the direction of the viewers; for example, a horizontal midpoint of each of the regions may substantially align with a direction vector emanating from the device to the respective viewer's determined location. The instances of visual content are then rendered on the respective regions of the display 608. For example, the regions may comprise particular portions of the display that are of a sufficient size and aligned with the respective viewer, and the instances of visual content are rendered on the display within the designated region of the display.

Figure 7:
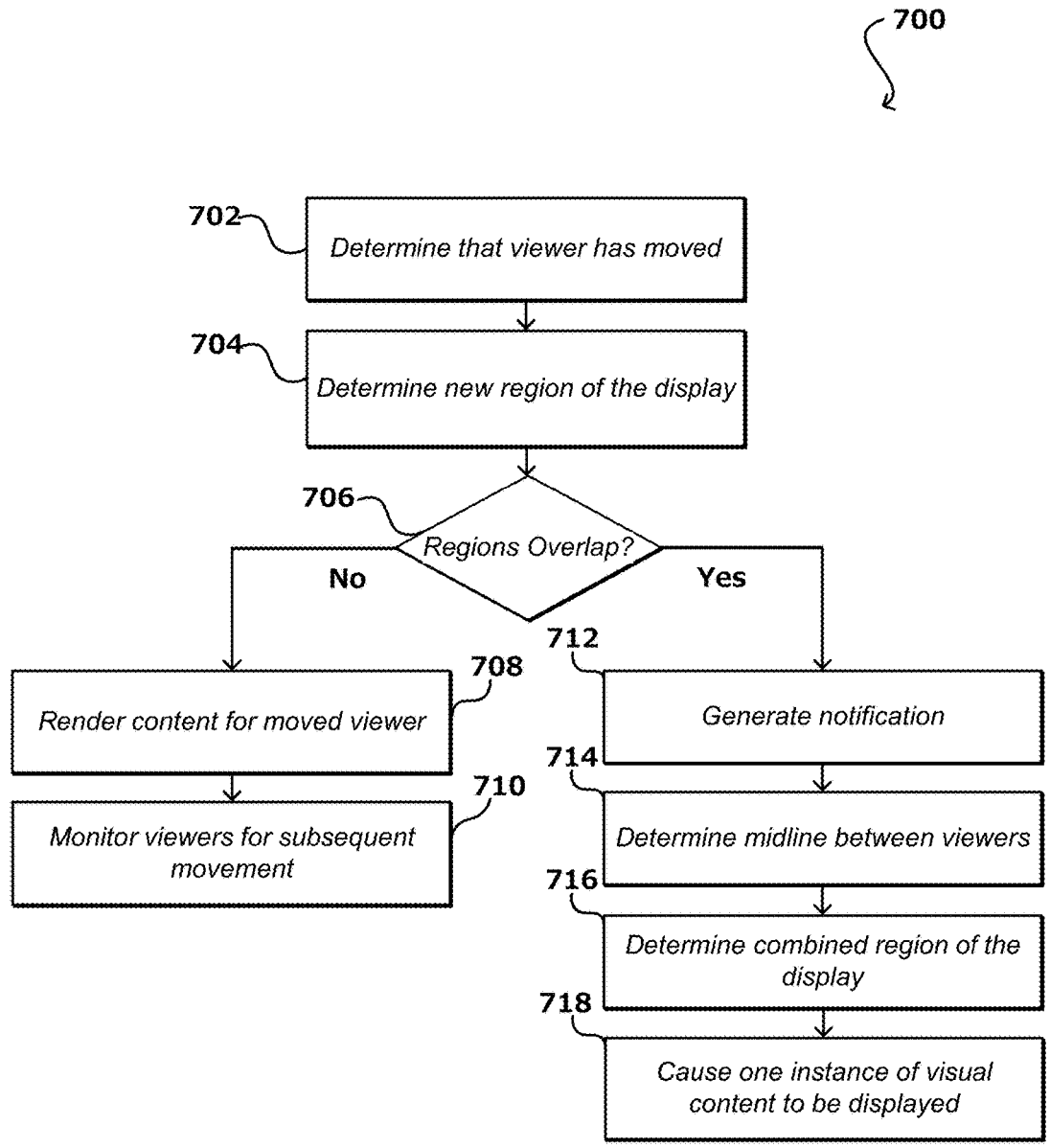
FIG. 7 illustrates an example process for displaying instances of visual content on a curved display, in accordance with various embodiments.

FIG. 7 illustrates an example process for displaying instances of visual content on a curved display, in accordance with various embodiments. Once directions to the viewers have been determined, for example as described with respect to FIG. 6, then the viewers are monitored (e.g., through audio or images, such as voice recognition, facial recognition, keywords in audio commands, etc.) for potential movement. Once it is determined that a viewer has moved 702, for example by the viewer issuing an audio command such that the individual viewer may be identified (e.g., using a specific keyword in the command, etc.), then a direction to the viewer is determined as described herein. If the viewer is determined to have moved, then a new region of the display is determined 704; for example, the new region may be identical to the previous region (e.g., size, content being rendered on the region, etc.), except in position of the display. A location of the new region on the display is determined as previously described, such that the region is substantially centered on the direction of the viewer's new location with respect to the device, and in the viewer's field of view of the display.

A determination is made whether the existing region for the non-moving viewer and the new region for the moving viewer overlap 706. In some embodiments, both (or more) viewers may move, such that several new regions are determined and then evaluated for overlapping portions. If the regions do not overlap, then the instance of visual content for the moved viewer is rendered in the new region 708, and no longer rendered in the old region. The device goes back to monitoring the viewers 710 for any subsequent movement.

If an overlap of the regions is determined, then in an embodiment, a notification is generated 712. For example, an alert may be displayed on the display, such as a flashing red light, a textual display, etc., or may be audibly delivered, such as an audio alert saying that the viewers are standing too close together. In some embodiments, the device may ask the viewers what action they wish to take in response to the overlap; for example, audibly or using a textual display on the display that is visible to both viewers (such as a joint text alert able to be seen by both viewers or separate text alerts, such as when the viewers are on opposite sides of the device). In the event of the display having touch capabilities, the viewers may provide feedback regarding a desired course of action by touching the screen, such as in an indicated location.

In the event that the instance of visual content are going to be combined (e.g., "snapped together," as described earlier) in response to the detected overlap, then a midline is determined 714 that emanates substantially equally between the determined directions corresponding to the locations of the viewers with respect to the device. A "combined" region of the display is determined 716; for example, a region of the display that is substantially centered on the horizontal axis along the determined midline, such that the combined region is within the field of view of both viewers. A single instance of visual content is then rendered 718 in the combined region of the display; for example, as described herein, a ranking or other priority may be utilized to determine which instance of content will be the one to be rendered in the combined region. According to an embodiment, on a display offering touch screen capability, any viewer may move the rendered content, for example by touching and dragging the portion of the display on which the content is being displayed. This may be utilized, for example, if the combined region is not adequately centered between the viewers due to estimation error, etc., and one of the viewers needs to shift the region slightly toward them so they may view a far edge of the content, for example.

Figure 8:
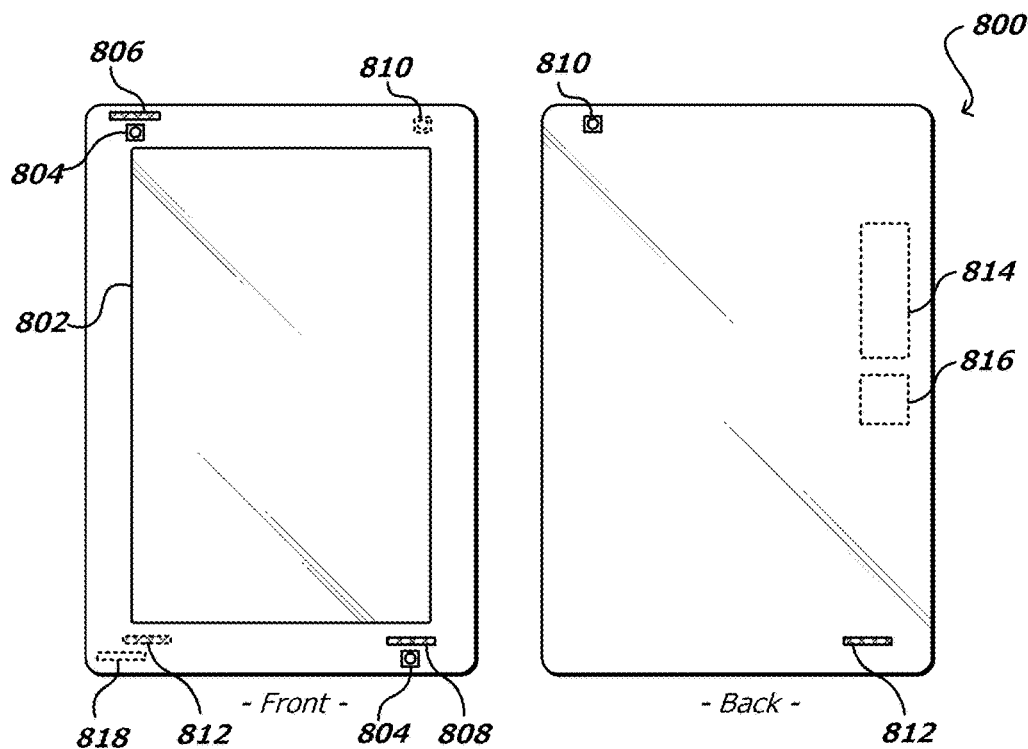
FIG. 8 illustrates front and back views of an example computing device that can be used in accordance with various embodiments.

FIG. 8 illustrates front and back views of an example electronic computing device 800 that can be used in accordance with various embodiments, for example, a mobile device configured for adjustable color temperature illumination using the techniques described herein. Although a computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, active listening devices, a wireless speaker and voice command device, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
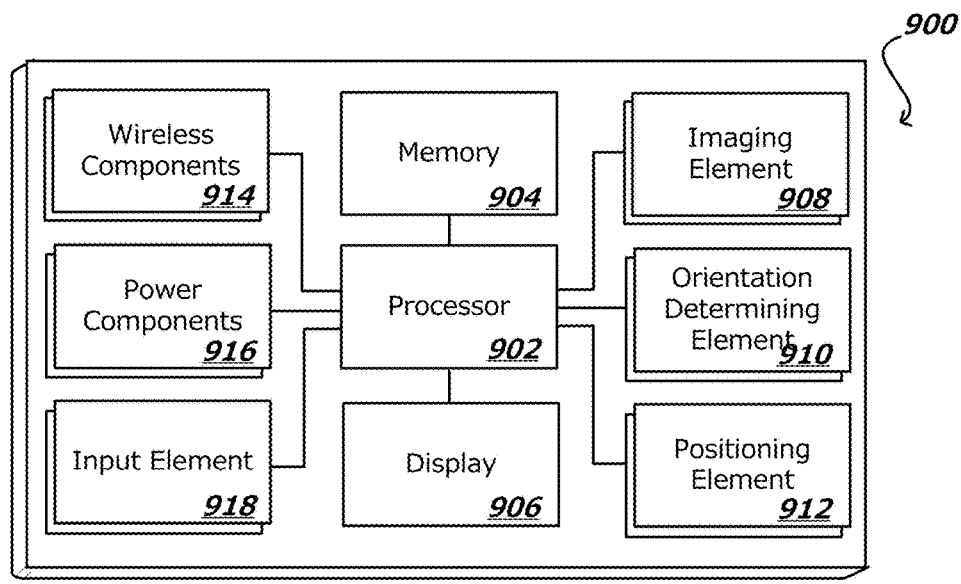
FIG. 9 illustrates an example set of basic components of a computing device, such as the device described with respect to FIG. 8.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, which may be a flexible curved display element, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
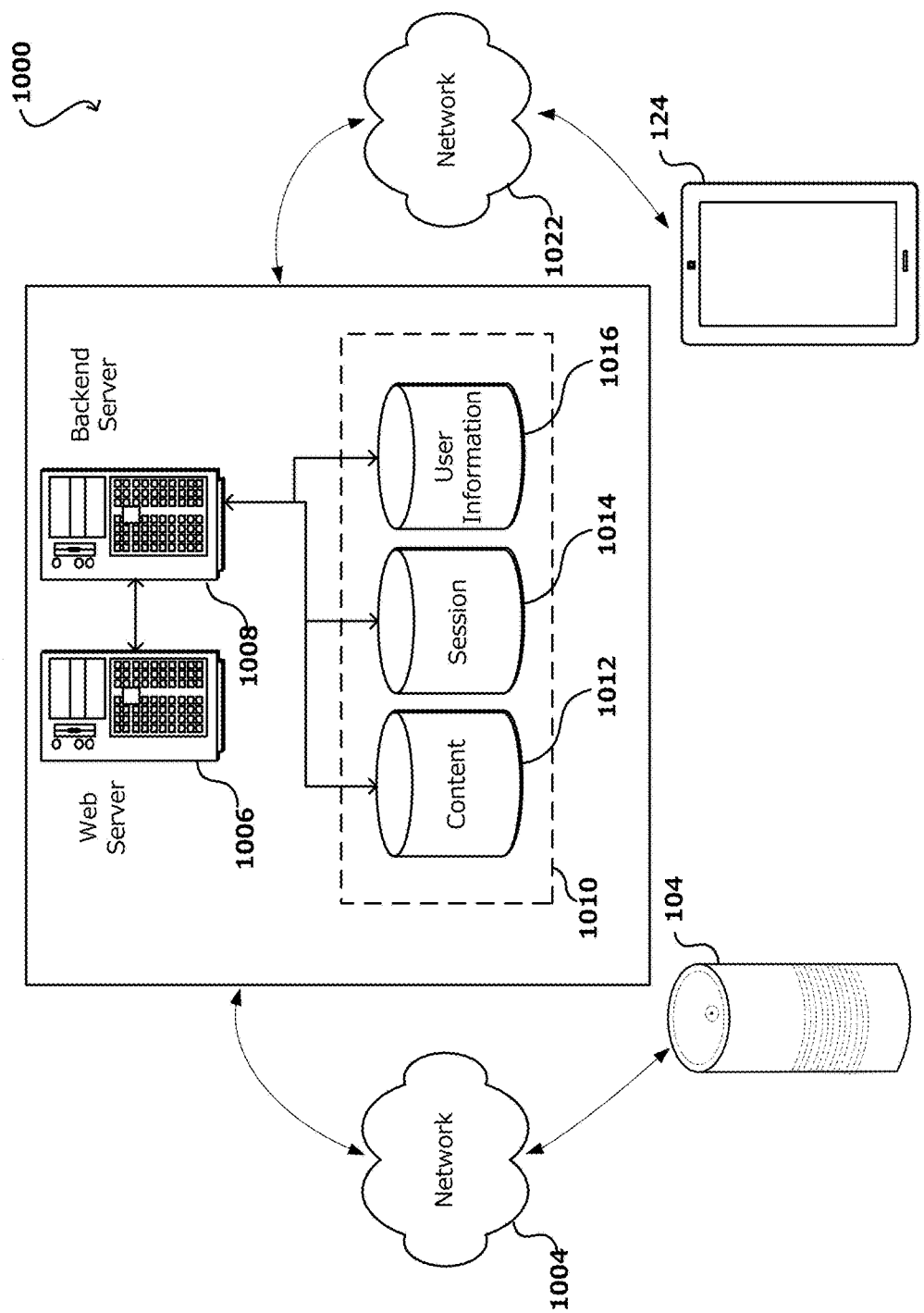
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes voice-enabled communications device 104 computing device 124, which can include any appropriate device operable to send and receive requests, messages or information over networks 1004 and 1022 and convey information back to an appropriate device. These devices can include, for example, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. The networks can include any appropriate network, including a telephone network provided by a telecommunication operator, an intranet, the Internet, a cellular network, a local area network, wireless network, or any other such network or combination thereof. The network could be a telephone network, a "push" network, a "pull" network, or a combination thereof. Wireless networks often include communication modes such as data transfer/text messaging. Text messaging takes the known form of the short messaging service (SMS), which allows point-to-point service by sending "short" messages to and from wireless handsets. The service uses a short message service center (SMSC) to store and forward short messages. The wireless network transports messages between the SMSCs and the subscriber units. With this service, an active subscriber unit, such as a mobile handset, can receive or transmit a short message at any time, independent of whether or not a voice or data call is in progress. The system guarantees delivery of the message with failures being identified and the message stored in the network until the destination is available. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one backend server 1008 and a data store 1010. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 1008 can include any appropriate hardware and software for integrating with the data store 1010 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 1006 in the form of HTML, XML or another appropriate structured language in this example. The handling of all requests and responses, as well as the delivery of content between the voice-enabled communications device 104 and computing device 124 and the backend server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be other information that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the backend server 1008 and obtain, update or otherwise process data in response thereto.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

Figure 11:
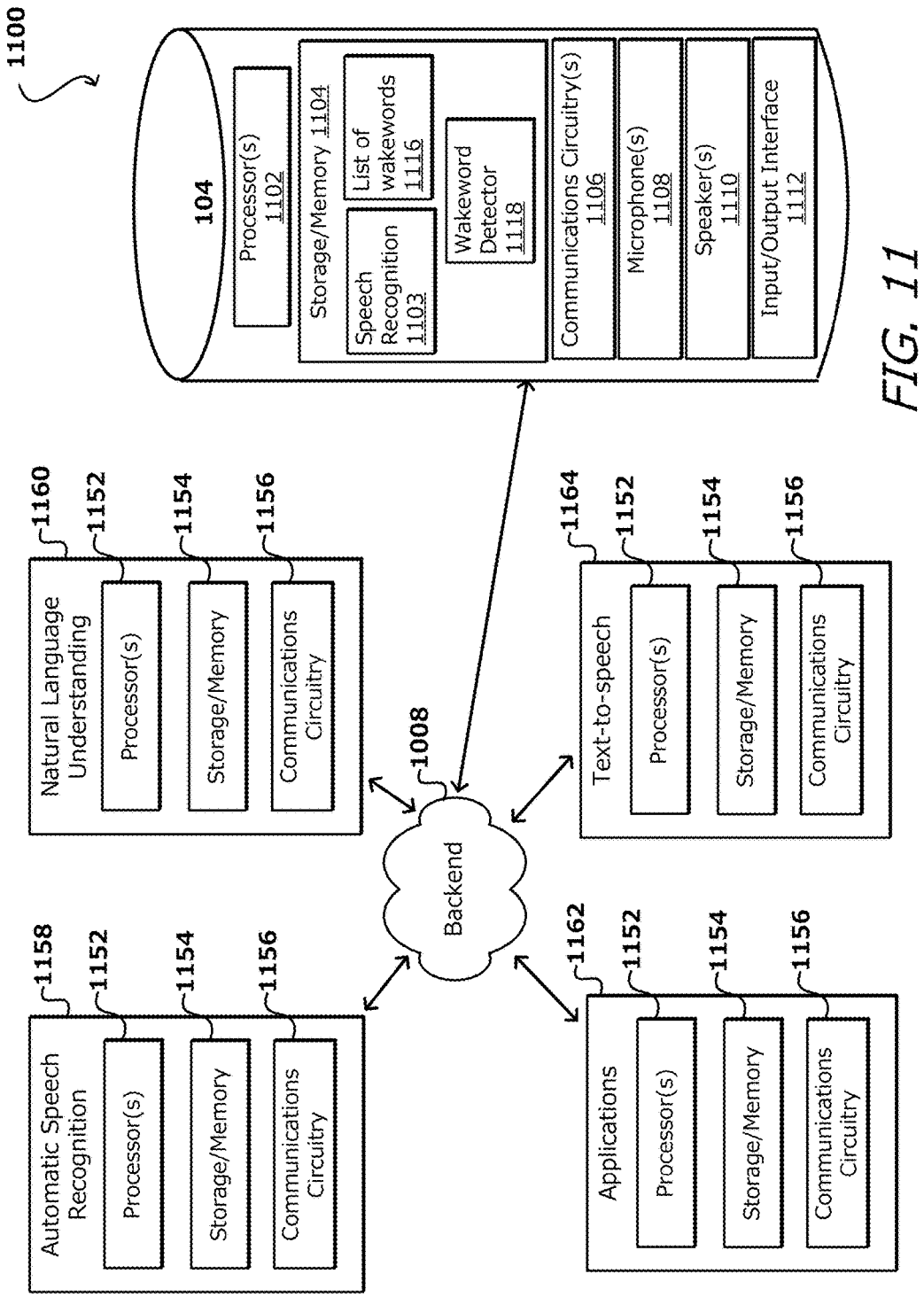
FIG. 11 illustrates another example environment for implementing aspects in accordance with various embodiments.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure FIG. 11 is another example environment 1100 for implementing aspects in accordance with various embodiments. In this example, voice-enabled communications device 104, in some embodiments, may correspond to any type of electronic device capable of being activated in response to detecting a specific sound. Voice-enabled communications device 104 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled communications device 104 may be relatively simple or basic in structure such that no mechanical input option(s) (e.g., keyboard, mouse, trackpad) or touch input(s) (e.g., touchscreen, buttons) may be provided. For example, voice-enabled communications device 104 may be capable of receiving and outputting audio, and may include power, processing capabilities, storage/memory capabilities, and communication capabilities.

Voice-enabled communications device 104 may include a minimal number of input mechanisms, such as a power on/off switch, however primary functionality, in one embodiment, of voice-enabled communications device 104 may solely be through audio input and audio output. For example, voice-enabled communications device 104 may listen for a wakeword by continually monitoring local audio. In response to the wakeword being detected, voice-enabled communications device 104 may establish a connection with backend server 1008, send audio input data to backend server 1008, and await/receive a response from backend server 1008. In some embodiments, however, non-voice-enabled devices may also communicate with backend server 1008 (e.g., push-to-talk devices).

Voice-enabled communications device 104 may include one or more processors 1102, storage/memory 1104, communications circuitry 1106, one or more microphones 1108 or other audio input devices (e.g., transducers), one or more speakers 1110 or other audio output devices, as well as an optional visual input/output ("I/O") interface 1112. However, one or more additional components may be included within voice-enabled communications device 104, and/or one or more components may be omitted. For example, voice-enabled communications device 104 may include a power supply or a bus connector. As another example, voice-enabled communications device 104 may not include a visual I/O interface. Furthermore, while multiple instances of one or more components may be included within voice-enabled communications device 104, for simplicity only one of each component has been shown.

Processor(s) 1102 may include any suitable processing circuitry capable of controlling operations and functionality of voice-enabled communications device 104, as well as facilitating communications between various components within voice-enabled communications device 104. In some embodiments, processor(s) 1102 may include a central processing unit ("CPU"), a graphic processing unit ("GPU"), one or more microprocessors, a digital signal processor, or any other type of processor, or any combination thereof. In some embodiments, the functionality of processor(s) 1102 may be performed by one or more hardware logic components including, but not limited to, field-programmable gate arrays ("FPGA"), application specific integrated circuits ("ASICs"), application-specific standard products ("AS-SPs"), system-on-chip systems ("SOCs"), and/or complex programmable logic devices ("CPLDs"). Furthermore, each of processor(s) 1102 may include its own local memory, which may store program modules, program data, and/or one or more operating systems. However, processor(s) 1102 may run an operating system ("OS") for voice-enabled communications device 104, and/or one or more firmware applications, media applications, and/or applications resident thereon.

Storage/memory 1104 may include one or more types of storage mediums such as any volatile or non-volatile memory, or any removable or non-removable memory implemented in any suitable manner to store data on voice-enabled communications device 104. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 1104 may be implemented as computer-readable storage media ("CRSM"), which may be any available physical media accessible by processor(s) 1102 to execute one or more instructions stored within storage/memory 1104. In some embodiments, one or more applications (e.g., gaming, music, video, calendars, lists, etc.) may be run by processor(s) 1102, and may be stored in memory 1104.

In some embodiments, storage/memory 1104 may include one or more modules and/or databases, such as speech recognition module 1103, list of wakewords database 1116, and wakeword detection module 1118. Speech recognition module 1103 may, for example, include an automatic speech recognition ("ASR") component that recognizes human speech in detected audio. Speech recognition module 1103 may also include a natural language understanding ("NLU") component that determines user intent based on the detected audio. Also included within speech recognition module 1103 may be a text-to-speech ("TTS") component capable of converting text to speech to be outputted by speaker(s) 1110, and/or a speech-to-text ("STT") component capable of converting received audio signals into text to be sent to backend server 1008 for processing.

List of wakewords database 1116 may be a database stored locally on voice-enabled communications device 104 that includes a list of a current wakeword for voice-enabled communications device 104, as well as one or more previously used, or alternative, wakewords for voice-enabled communications device. In some embodiments, user 102 may set or program a wakeword for voice-enabled communications device 104. The wakeword may be programmed directly on voice-enabled communications device 104, or a wakeword or words may be set by the individual via a backend server application (app) that is in communication with backend server 1008. For example, a user may use their mobile device having the backend server application running thereon to set the wakeword. The specific wakeword may then be communicated from the mobile device to backend server 1008, which in turn may send/notify voice-enabled communications device 104 of the individual's selection for the wakeword. The selected activation may then be stored in list of wakewords database 1116 of storage/memory 1104.

Wakeword detection module 1118 may include an expression detector that analyzes an audio signal produced by microphone(s) 1108 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 1108. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 1108. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the MINI model of the audio signal to one or more reference HMM models that have been created by training for specific trigger expressions. An HMM model represents a word as a series of states. Generally a portion of an audio signal is analyzed by comparing its HMM model to an MINI model of the trigger expression, yielding a feature score that represents the similarity of the audio signal model to the trigger expression model.

In practice, an MINI recognizer may produce multiple feature scores, corresponding to different features of the MINI models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 104 may then begin sending the audio signal to backend server 1008 for detecting and responds to subsequent utterances made by user 102.

Communications circuitry 1106 may include any circuitry allowing or enabling voice-enabled communications device 104 to communicate with one or more devices, servers, and/or systems. For example, communications circuitry 1106 may facilitate communications between voice-enabled communications device 104 and backend server 1008. Communications circuitry 1106 may use any communications protocol, such as any of the previously mentioned exemplary communications protocols. In some embodiments, voice-enabled communications device 104 may include an antenna to facilitate wireless communications with a network using various wireless technologies (e.g., Wi-Fi, Bluetooth, radiofrequency, etc.). In yet another embodiment, voice-enabled communications device 104 may include one or more universal serial bus ("USB") ports, one or more Ethernet or broadband ports, and/or any other type of hardwire access port so that communications circuitry 1106 allows voice-enabled communications device 104 to communicate with one or more communications networks.

Voice-enabled communications device 104 may also include one or more microphones 1108 and/or transducers. Microphone(s) 1108 may be any suitable component capable of detecting audio signals. For example, microphone(s) 1108 may include one or more sensors for generating electrical signals and circuitry capable of processing the generated electrical signals. In some embodiments, microphone(s) 1108 may include multiple microphones capable of detecting various frequency levels. As an illustrative example, voice-enabled communications device 104 may include multiple microphones (e.g., four, seven, ten, etc.) placed at various positions about voice-enabled communications device 104 to monitor/capture any audio outputted in the environment where voice-enabled communications device 104 is located. The various microphones 1108 may include some microphones optimized for distant sounds, while some microphones may be optimized for sounds occurring within a close range of voice-enabled communications device 104.

Voice-enabled communications device 104 may further include one or more speakers 1110. Speaker(s) 1110 may correspond to any suitable mechanism for outputting audio signals. For example, speaker(s) 1110 may include one or more speaker units, transducers, arrays of speakers, and/or arrays of transducers that may be capable of broadcasting audio signals and or audio content to a surrounding area where voice-enabled communications device 104 may be located. In some embodiments, speaker(s) 1110 may include headphones or ear buds, which may be wirelessly wired, or hard-wired, to voice-enabled communications device 104, that may be capable of broadcasting audio.

In some embodiments, one or more microphones 1108 may serve as input devices to receive audio inputs, such as speech. Voice-enabled communications device 104, may then also include one or more speakers 1110 to output audible responses. In this manner, voice-enabled communications device 104 may function solely through speech or audio, without the use or need for any input mechanisms or displays.

In one exemplary embodiment, voice-enabled communications device 104 includes I/O interface 1112. The input portion of I/O interface 1112 may correspond to any suitable mechanism for receiving inputs from a user of voice-enabled communications device 104. For example, a camera, keyboard, mouse, joystick, or external controller may be used as an input mechanism for I/O interface 1112. The output portion of I/O interface 1112 may correspond to any suitable mechanism for generating outputs from voice-enabled communications device 104. For example, one or more displays may be used as an output mechanism for I/O interface 1112. As another example, one or more lights, light emitting diodes ("LEDs"), or other visual indicator(s) may be used to output signals via I/O interface 1112 of voice-enabled communications device 104. In some embodiments, one or more vibrating mechanisms or other haptic features may be included with I/O interface 1112 to provide a haptic response to user 102 from voice-enabled communications device 104. Persons of ordinary skill in the art will recognize that, in some embodiments, one or more features of I/O interface 1112 may be included in a purely voice-enabled version of voice-enabled communications device 104. For example, one or more LED lights may be included on voice-enabled communications device 104 such that, when microphone(s) 1108 receive audio from user 102, the one or more LED lights become illuminated signifying that audio has been received by voice-enabled communications device 104. In some embodiments, I/O interface 1112 may include a display screen and/or touch screen, which may be any size and/or shape and may be located at any portion of voice-enabled communications device 104. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 11 also includes backend server 1008, as mentioned previously, which may be in communication with voice-enabled communications device 104. Backend server 1008 includes various components and modules including, but not limited to, automatic speech recognition ("ASR") module 1158 (which may include, for example, speech-to-text ("STT") functionality), natural language understanding ("NLU") module 1160, applications module 1162, and text-to-speech ("TTS") module 1164. In some embodiments, backend server 1008 may also include computer readable media, including, but not limited to, flash memory, random access memory ("RAM"), and/or read-only memory ("ROM"). Backend server 1008 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 1158 may be configured such that it recognizes human speech in detected audio, such as audio captured by voice-enabled communications device 104, which is then sent to backend server 1008. ASR module 1158 may include, in one embodiment, one or more processor(s) 1152, storage/memory 1154, and communications circuitry 1156. Processor(s) 1152, storage/memory 1154, and communications circuitry 1156 may, in some embodiments, be substantially similar to processor(s) 1102, storage/memory 1104, and communications circuitry 1106, which are described in greater detail above, and the aforementioned descriptions of the latter may apply. NLU module 1160 may be configured such that it determines user intent based on the detected audio received from voice-enabled communications device 104. NLU module 1160 may include processor(s) 1152, storage/memory 1154, and communications circuitry 1156.

Applications module 1162 may, for example, correspond to various action specific applications or servers capable of processing various task specific actions. Applications module 1162 may further correspond to first party applications and/or third party applications operable to perform different tasks or actions. For example, based on the context of audio received from voice-enabled communications device 104, backend server 1008 may use a certain application to perform an action, such as sending a text message. Applications module 1162 may include processor(s) 1152, storage/memory 1154, and communications circuitry 1156. As an illustrative example, applications module 1162 may correspond to an electronic messaging application. Audio input data can be received at automatic speech recognition module 1158 from voice-enabled communications device 104. The automatic speech recognition module 1158 can use automatic speech recognition (ASR) techniques on the audio input data to generate text data of the audio input data. The natural language understanding module 1160 can use natural language understanding (NLU) techniques on the text data to determine an intended recipient and generate message body data. The electronic messaging application of the applications module 1162 can receive information including the customer account, the intended recipient, and message body data.

TTS module 1164 may employ various text-to-speech techniques. It should be noted that techniques for taking text and converting it into audio input data that can represent speech are well known in the art and need not be described in further detail herein, any suitable computer implemented techniques may be used. TTS module 1164 may also include processor(s) 1152, storage/memory 1154, and communications circuitry 1156.

Persons of ordinary skill in the art will recognize that although each of ASR module 1158, NLU module 1160, applications module 1162, and TTS module 1164 include instances of processor(s) 1152, storage/memory 1154, and communications circuitry 1156, those instances of processor(s) 1152, storage/memory 1154, and communications circuitry 1156 within each of ASR module 1158, NLU module 1160, applications module 1162, and STT/TTS module 1164 may differ. For example, the structure, function, and style of processor(s) 1152 within ASR module 1158 may be substantially similar to the structure, function, and style of processor(s) 1152 within NLU module 1160, however the actual processor(s) 1152 need not be the same entity.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a cylindrical housing;
    a flexible display screen wrapped around a portion of the cylindrical housing and attached to an outer surface of the cylindrical housing;
    a plurality of microphones disposed in the cylindrical housing;
    at least one processor; and
    memory including instructions that, when executed by the at least one processor, cause the computing device to:
        acquire, using the plurality of microphones, first speech input;
        determine, based at least on the first speech input including a first trigger word associated with a user, a first lateral direction corresponding to a first location of the user;
        cause first content to be displayed on a first region of the flexible display screen, the first region being entirely within a viewing range from the first location, the first region being substantially centered at a first point on the flexible display screen corresponding to an axis normal to the flexible display screen and in the first lateral direction;
        determine a rate of a movement of the user from the first location to a second location, the second location corresponding to a second viewing range that is different from the viewing range of the first location; and
        cause second content to be displayed on a second region of the flexible display screen corresponding to a second axis normal to the flexible display screen and in a second lateral direction, a timing of the second content being displayed relative to the first content depending at least in part upon the rate of movement.

2. The computing device of claim 1, further comprising instructions that, when executed by the at least one processor, cause the computing device to:
    acquire, from the plurality of microphones, audio data;
    determine that the audio data is associated with the user;
    determine, based at least on the audio data, a third lateral direction corresponding to a new location of the user;
    determine a third region of the flexible display screen for display of the first content being entirely within a third viewing range from the new location, the third region being substantially centered at a third point on the flexible display screen corresponding to a third axis normal to the flexible display screen and in the third lateral direction;
    determine that the second region and the third region overlap;
    determine a fourth region of the flexible display screen being entirely within a fourth viewing range from the second location, the fourth region being substantially centered at a fourth point on the flexible display screen corresponding to a fourth axis normal to the flexible display screen and in a fourth lateral direction, the fourth point being substantially midway between the second lateral direction and the third lateral direction;
cause the first content to be displayed in the fourth region of the flexible display screen, and
cease display of the second content.

3. The computing device of claim 2, further comprising instructions that, when executed by the at least one processor, cause the computing device to:
determine that the audio data is associated with a second user;
determine, based at least on the audio data, a fifth lateral direction corresponding to a new location of the second user;
determine a fifth region of the flexible display screen being entirely within a fifth viewing range from the new location, the fifth region being substantially centered at a fifth point on the flexible display screen corresponding to a fifth axis normal to the flexible display screen and in the fifth lateral direction;
determine that the fourth region and the fifth region do not overlap; and
cause the second content to be displayed on the fifth region of the flexible display screen.

4. The computing device of claim 3, further comprising instructions that, when executed by the at least one processor, cause the computing device to:
determine a first priority rank associated with the first content, the first priority rank being based at least on one of an identity of the user or a category associated with the first content;
determine a second priority rank associated with the second content, the second priority rank being based at least on one of an identity of the second user or a category associated with the second content;
determine that the first priority rank is higher than the second priority rank; and select the first content for display.

5. A method, comprising:
acquiring by a device having a display, first audio data associated with a user;
determining, by the device based at least on the first audio data, a first lateral direction corresponding to the user;
generating, by the device, first content to be displayed in a first region of the display, a first horizontal midpoint of the first content being substantially aligned with an axis in the first lateral direction and normal to the display;
determining a rate of movement of the user in the first lateral direction from a first location to a second location, the second location corresponding to a second viewing range that is different from a first viewing range of the first location; and
causing a current frame of the first content to be displayed on a second region of the display based at least on the first lateral direction and the rate of the movement.

6. The method of claim 5, further comprising:
determining that the first user has moved to a new location having a third direction;
determining a third region of the display in which the first content is to be displayed substantially centered in the third direction;
determining that the second region and the third region overlap;
determining a fourth region such that the second region and the fourth region do not overlap;
generating modified first content such that the modified first content fits within the fourth region; and
causing the modified first content to be displayed in the fourth region, the modified first content substantially centered in the third direction.

7. The method of claim 6, wherein generating modified first content comprises at least one of modifying an aspect ratio of the first content, resizing the first content, resampling the first content, or cropping the first content.

8. The method of claim 5, wherein the user is a first user, the method further comprising:
acquiring, by the device having the display, second audio data associated with a second user;
determining, by the device based at least on the second audio data, a second direction corresponding to the second user of the display; and
causing, by the device, second content to be displayed in the second region of the display, a second horizontal midpoint of the second content being substantially aligned with the second axis in the second direction and normal to the display, wherein the first region and the second region do not overlap.

9. The method of claim 8, further comprising:
determining that the first user has moved to a new location along a third direction relative to the device;
determining a potential region of the display in which the first content is to be displayed, a third horizontal midpoint of the potential region of the display being substantially aligned with a third axis in the third direction and normal to the display;
determining that the second region and the potential region overlap;
causing the first content to be displayed in a third region of the display, the third region being substantially centered at a point on the display corresponding to a fourth axis normal to the display and in a fourth direction, the point being substantially midway between the second direction and the third direction; and
ceasing display of the second content.

10. The method of claim 9, further comprising:
causing, upon determining that the second region and the potential region overlap, an audio alert to be played by the device, the audio alert including a trigger word associated with the first user, the audio alert indicating that the new location of the first user is too close to the second user, wherein the audio alert is played prior to causing the first content to be displayed in the third region of the display.

11. The method of claim 9, further comprising:
upon determining that the second region and the potential region overlap:
causing a first visual indicator associated with the first user to be displayed; and
causing a second visual indicator associated with the second user to be displayed, wherein the first visual indicator and the second visual indicator substantially correspond to potential directions of a closest position the first user and the second user could occupy with respect to the device such that the second region and the potential region would not overlap.

12. The method of claim 9, further comprising:
determining that the second user has moved to a new location having a fourth direction;

determining a fourth region of the display in which the second content is to be displayed substantially centered in the fourth direction;

determining that the third region and the fourth region do not overlap;

causing the second content to be displayed in the fourth region of the display, the second content substantially centered in the fourth direction;

ceasing display of the first content in the third region; and displaying the first content in a fifth region of the display that does not overlap the fourth region of the display, the first content being substantially centered in the third direction.

13. The method of claim 9, further comprising:

determining a first priority rank associated with the first content;

determining a second priority rank associated with the second content;

determining that the first priority rank is higher than the second priority rank; and selecting the first content for display, wherein the first priority rank and the second priority rank is based at least on one of an identity of the first user or the second user, a content type associated with the first content or the second content, an order in which the first content and the second content was caused to be displayed, an audio command received by an audio capture element of the device, or a gesture detected by an image capture device of the device.

14. A computing device, comprising:

a cylindrical housing;

a curved display element attached to the cylindrical housing;

at least one processor; and memory including instructions that, when executed by the at least one processor, cause the computing device to:

acquire, by the computing device having a display, first audio data associated with a user;

determine, by the computing device based at least on the first audio data, a first lateral direction corresponding to the user;

generate, by the computing device, first content to be displayed in a first region of the display, a first horizontal midpoint of the first content being substantially aligned with an axis in the first direction and normal to the display;

determine a rate of movement of the user in the first lateral direction from a first location to a second location, the second location corresponding to a second viewing range that is different from a first viewing range of the first location; and cause a current frame of the first content to be displayed on a second region of the display based at least on the first lateral direction and the rate of the movement.

15. The computing device of claim 14, wherein the user is a first user, the computing device further comprising instructions that, when executed by the at least one processor, cause the computing device to:

acquire, by the device having the display, second audio data associated with a second user;

determine, by the device based at least on the second audio data, a second direction corresponding to the second user of the display;

cause, by the device, second content to be displayed in the second region of the display, a second horizontal midpoint of the second content being substantially aligned with a second axis in the second direction and normal to the display, wherein the first region and the second region do not overlap;

determine that the first user has moved to a new location along a third lateral direction relative to the computing device;

determine a potential region of the display in which the first content is to be displayed, a third horizontal midpoint of the potential region of the display being substantially aligned with a third axis in the third lateral direction and normal to the display;

determine that the second region and the potential region overlap;

cause the first content to be displayed in a third region of the display, the third region being substantially centered at a point on the display corresponding to a fourth axis normal to the display and in a fourth lateral direction, the point being substantially midway between a second lateral direction and the third lateral direction; and cease display of the second content.

16. The method of claim 15, further comprising instructions that, when executed by the at least one processor, cause the computing device to:

cause, upon determining that the second region and the potential region overlap, an audio alert to be played by the computing device, the audio alert including a trigger word associated with the first user, the audio alert indicating that the new location of the first user is too close to the second user, wherein the audio alert is played prior to causing the first content to be displayed in the third region of the display.

17. The method of claim 15, further comprising instructions that, when executed by the at least one processor, cause the computing device to:

determine that the second user has moved to a new location having a fifth lateral direction;

determine a fourth region of the display in which the second content is to be displayed substantially centered in the fifth lateral direction;

determine that the third region and the fourth region do not overlap;

cause the second content to be displayed in the fourth region of the display, the second content substantially centered in the fifth lateral direction; and cause the first content to be moved from the third region of the display to a fifth region of the display that does not overlap the fourth region of the display, the first content being substantially centered in the third lateral direction.

18. The computing device of claim 15, further comprising instructions that, when executed by the at least one processor, cause the computing device to:

determine a first priority rank associated with the first content;

determine a second priority rank associated with the second content;

determine that the first priority rank is higher than the second priority rank; and select the first content for display, wherein the first priority rank and the second priority rank is based at least on one of an identity of the first user or the second user, a content type associated with the first content or the second content, an order in which the first content and the second content was caused to be displayed, an audio command received by an audio capture element of the computing device, or a gesture detected by an image capture device of the computing device.

19. The method of claim 14, further comprising instructions that, when executed by the at least one processor, cause the computing device to:
- determine that the first user has moved to a new location having a third lateral direction;
- determine a third region of the display in which the first content is caused to be displayed substantially centered in the third lateral direction;
- determine that the second region and the third region overlap;
- determine a fourth region such that the second region and the fourth region do not overlap;
- generate modified first content such that the modified first content fits within the fourth region; and
- cause the modified first content to be displayed in the fourth region, the modified first content substantially centered in the third lateral direction.

20. The computing device of claim 19, wherein generating modified first content comprises at least one of modifying an aspect ratio of the first content, resizing the first content, resampling the first content, or cropping the first content.

* * * * *